(12) United States Patent
Walker et al.

(10) Patent No.: US 7,944,967 B2
(45) Date of Patent: May 17, 2011

(54) TECHNIQUE FOR ADDRESSING FRAME LOSS IN A VIDEO STREAM

(75) Inventors: Glenn A. Walker, Greentown, IN (US); Timothy D. Bolduc, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 1692 days.

(21) Appl. No.: 11/191,856

(22) Filed: Jul. 28, 2005

(65) Prior Publication Data

US 2007/0028274 A1 Feb. 1, 2007

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.01

(58) Field of Classification Search .................. None
See application file for complete search history.

(56) References Cited

U.S. PATENT DOCUMENTS

| | | | |
|---|---|---|---|
| 6,681,397 B1 * | 1/2004 | Tsai et al. ...................... 725/92 |
| 6,798,791 B1 * | 9/2004 | Riazi et al. ..................... 370/515 |
| 6,801,499 B1 * | 10/2004 | Anandakumar et al. ...... 370/229 |
| 6,876,705 B2 * | 4/2005 | Katsavounidis et al. 375/240.28 |
| 7,676,722 B2 * | 3/2010 | Setton et al. .................. 714/748 |
| 2007/0101378 A1 * | 5/2007 | Jacobs ............................ 725/90 |

* cited by examiner

*Primary Examiner* — Nhon T Diep
(74) *Attorney, Agent, or Firm* — Jimmy L. Funke

(57) ABSTRACT

A technique for addressing frame loss in a video system includes a number of steps. Initially, a first video stream and a second video stream are received. The first and second video streams each include related video information having a plurality of video frames. At least one of the first and second video streams is buffered and lost or corrupted video frames associated with the first video stream are replaced with uncorrupted video frames from the second video stream.

22 Claims, 2 Drawing Sheets

TECHNIQUE FOR ADDRESSING FRAME LOSS IN A VIDEO STREAM

TECHNICAL FIELD

The present invention is generally directed to video streams and, more specifically, to a technique for addressing frame loss in a video stream.

BACKGROUND OF THE INVENTION

A primary drawback of utilizing a satellite-based video system to provide video to a motor vehicle is the general lack of time diversity in such systems. While certain systems have implemented complex tracking antenna subsystems to optimize the time that a video signal is available to a mobile receiver, such systems have been generally incapable of mitigating signal loss attributable to such signal blockage by obstacles, such as overpasses. While certain systems, such as satellite digital audio radio service (SDARS) systems, have been architected to mitigate signal loss due to obstacles, in that the SDARS system were designed to include time diversity, the addition of time diversity in an SDARS system is not without cost, as the information is essentially transmitted twice. It should be appreciated that this reduces the amount of data bandwidth available in the system and generally requires multiple transmitters.

Today, a number of different video receiver systems have been proposed and/or designed to render video from multiple sources. For example, at least one video receiver system has been implemented or proposed that can render different video formats, such as SDARS video, digital video broadcast-satellite (DVB-S) video and national television system committee (NTSC) video. Other robust wireless video technologies, such as digital video broadcast-handhelds (DVB-H), digital video broadcast-terrestrial (DVB-T), MEDIAFLO™ (QualComm), VCAST™ (Verizon) and integrated services digital broadcast-terrestrial (ISDB-T) are currently under development. Unfortunately, mobile video receivers that utilize streaming video technology have displayed sub-standard blocky, frozen video, when data is not received correctly. One solution to this problem would be for a DVB system to replicate a desired satellite signal with another redundant satellite signal similar to the SDARS system. However, this is a relatively expensive proposition in both hardware cost (for new satellites) and in bandwidth cost (in that new frequencies would be required).

What is needed is a technique to address frame loss in a video stream that can be implemented in a relatively economical manner.

SUMMARY OF THE INVENTION

According to one embodiment of the present invention, a technique for addressing frame loss in a video system is implemented that includes a number of steps. Initially, a first video stream and a second video stream are received. The first and second video streams each include related video information having a plurality of video frames. At least one of the first and second video streams is buffered and corrupt video frames associated with the first video stream are replaced with uncorrupted video frames associated with the second video stream.

According to another aspect of the present invention, the first and second video streams have the same format and the first video stream is a time delayed version of the second video stream. According to this aspect of the present invention, a time delay between the first and second video streams is a predetermined value known to a receiver of the first and second video streams.

According to a different embodiment of the present invention, the first and second video streams each include watermarks that are correlated to facilitate video frame alignment. According to a different aspect of the present invention, the first and second video streams are cross-correlated in time to facilitate video frame alignment. According to yet another embodiment, the first and second video streams each include time codes that are utilized to correlate the first and second video streams to facilitate video frame alignment.

According to yet another aspect of the present invention, the first and second video streams are formatted as satellite digital audio radio (SDAR) video, digital video broadcast-satellite (DVB-S) video, digital video broadcast-handheld (DVB-H) video, digital video broadcast-terrestrial (DVB-T) video, integrated services digital broadcast-terrestrial (ISDB-T) video, VCAST video, MEDIAFLO™ video or national television system committee (NTSC) video. According to this aspect of the present invention, a format of the second video stream is different from the first video stream.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
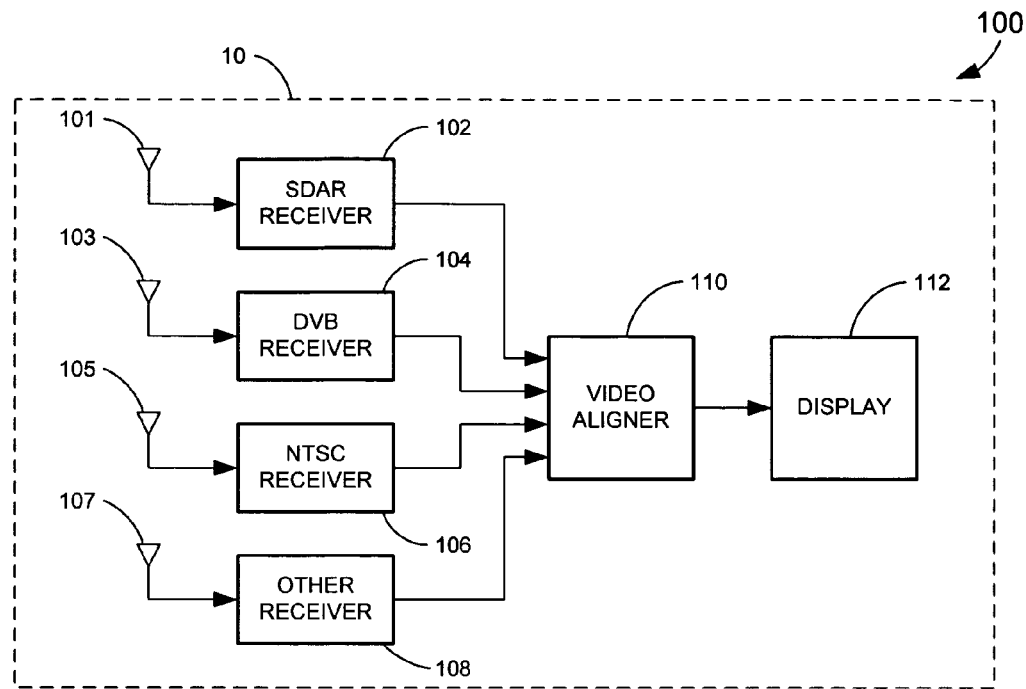
FIG. 1 is a block diagram of an exemplary video combiner system, constructed according to one embodiment of the present invention.

According to one aspect of the present invention, video signals, which are received from multiple broadcasts, are correlated to recover missing data in a primary video signal. According to this aspect of the present invention, metadata contained in the video streams and/or program guide data may be utilized to ensure that both streams represent the same content. According to the present invention, the video signals may be correlated by a number of different techniques. For example, time alignment information may be recovered from within the streams to correlate the data streams. For example, motion picture expert group (MPEG) packetized elementary streams (PES) contain time stamps to allow for the alignment of separate audio and video streams.

According to another aspect of the present invention, alignment of the video streams may be achieved by recovering time alignment information, which is included with the video streams. For example, the time alignment information may be watermarks that are embedded within the streams. According to this aspect of the present invention, the decoded video may be searched for the embedded watermarks to facilitate alignment of the video streams.

According to a different aspect of the present invention, time alignment may be achieved through classical correlation techniques. According to another aspect of the present invention, relative time alignment information may be recovered from one of the broadcasters. As digital streamed video is buffered prior to decoding, various aspects of the present invention provide a time diversity solution for receiver systems that receive at least one digital broadcast. The present invention can be deployed as a receiver site technology that does not require consideration by various broadcasters. Furthermore, it should be appreciated that video broadcasts do not need to broadcast video having the same format (e.g., resolution, frame rate, color space, etc.) for the alignment techniques of the present invention to function correctly. It should also be appreciated that utilizing data from up-sampled lower resolution video frames is generally more desirable than displaying macro-block errors in the video.

As noted above, loss of video frames within a video stream may be addressed by a number of different techniques. To reiterate, according to one embodiment of the present invention, separate video frames, each transmitted at a different time delay known by the receiver, may be implemented. This allows the replacement of lost video frames with buffered video frames. As noted above, the video frames may also be encoded with watermarks. The watermarks can then be searched for in the different video frames to align the frames in time. Thus, if each source has the same watermark on the same frame, a cross-correlation can be performed on the frame watermark. As is also noted above, another solution is to perform a rough cross-correlation between the two separate video frames to align the frames in time. According to this embodiment of the present invention, it is assumed that a rough time difference is known in the receiver to limit the length of cross-correlation. Finally, time codes contained within the separate streams may be utilized to correlate the sources to a common reference point in time. As digital video streams generally contain synchronization information to allow proper rendering of distinct video and audio streams, the synchronization information can be used to correlate streams from different sources back to a point in time.

With reference to FIG. 1, a motor vehicle 10 that includes a video combiner system 100 is depicted. The system 100 includes a plurality of receivers 102, 104, 106 and 108, each of which include an associated antenna 101, 103, 105 and 107, respectively. As is shown in FIG. 1, the receiver 102 is a satellite digital audio radio (SDAR) receiver, the receiver 104 is a digital video broadcast (DVB) receiver, the receiver 106 is a national television system committee (NTSC) receiver and the receiver 108 may be any of the other type of receivers discussed herein or receivers of other types. The outputs of the receivers 102, 104, 106 and 108 are coupled to an input of a video aligner 110, which correlates the video streams received by the different receivers 102-108, to ensure that lost or corrupted video frames associated with a primary receiver, e.g., receiver 102, are replaced by video frames associated with a secondary receiver, e.g., receivers 104, 106 and 108.

The video aligner 110 is constructed to replace lost or corrupted video frames, associated with a primary video stream, and provides a decoded video signal to display 112. In this manner, the system 100 addresses frame loss in a video stream by replacing lost or corrupted frames associated with a primary video stream with a correlated video frame from a secondary video stream. The video aligner 110 is shown in greater detail in FIG. 1A.

Figure 1A:
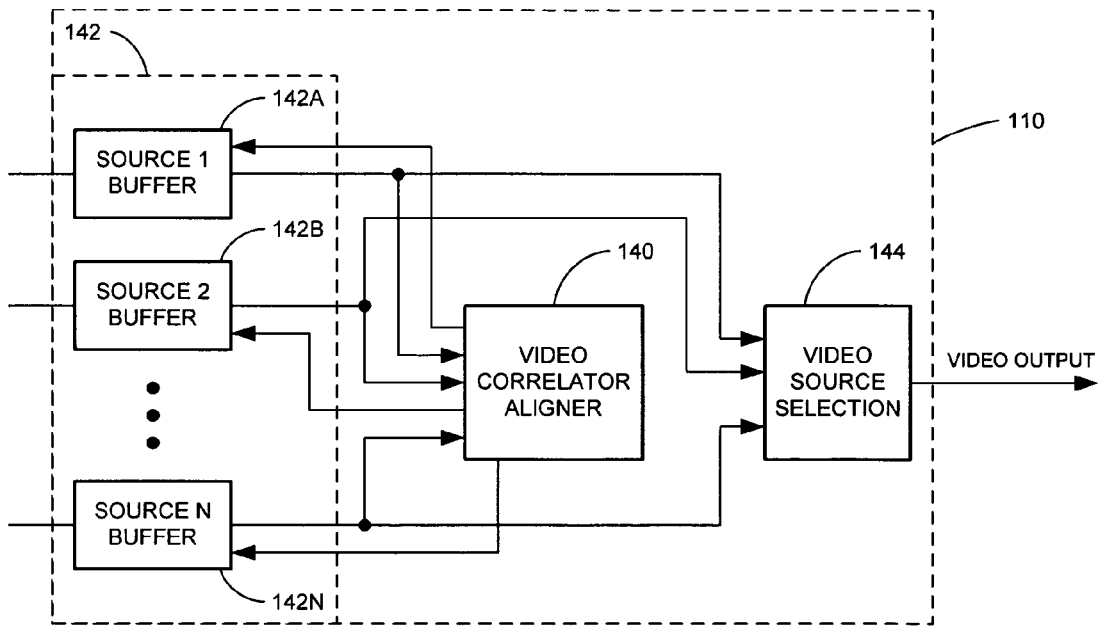
FIG. 1A is an exemplary electrical block diagram of the video aligner of FIG. 1.

With reference to FIG. 1A, the video aligner 110 includes a buffer 142, which includes one or more buffers 142A, 142B-142N, depending upon the number of sources that the system 100 is designed to receive. As is shown, a video correlator aligner 140 controls which of the source buffers 142A, 142B-142N provide video to a video source selection block 144 at any point in time. It should be appreciated that the video correlator aligner will take various forms depending upon the particular embodiment of the present invention that is implemented.

Figure 2:
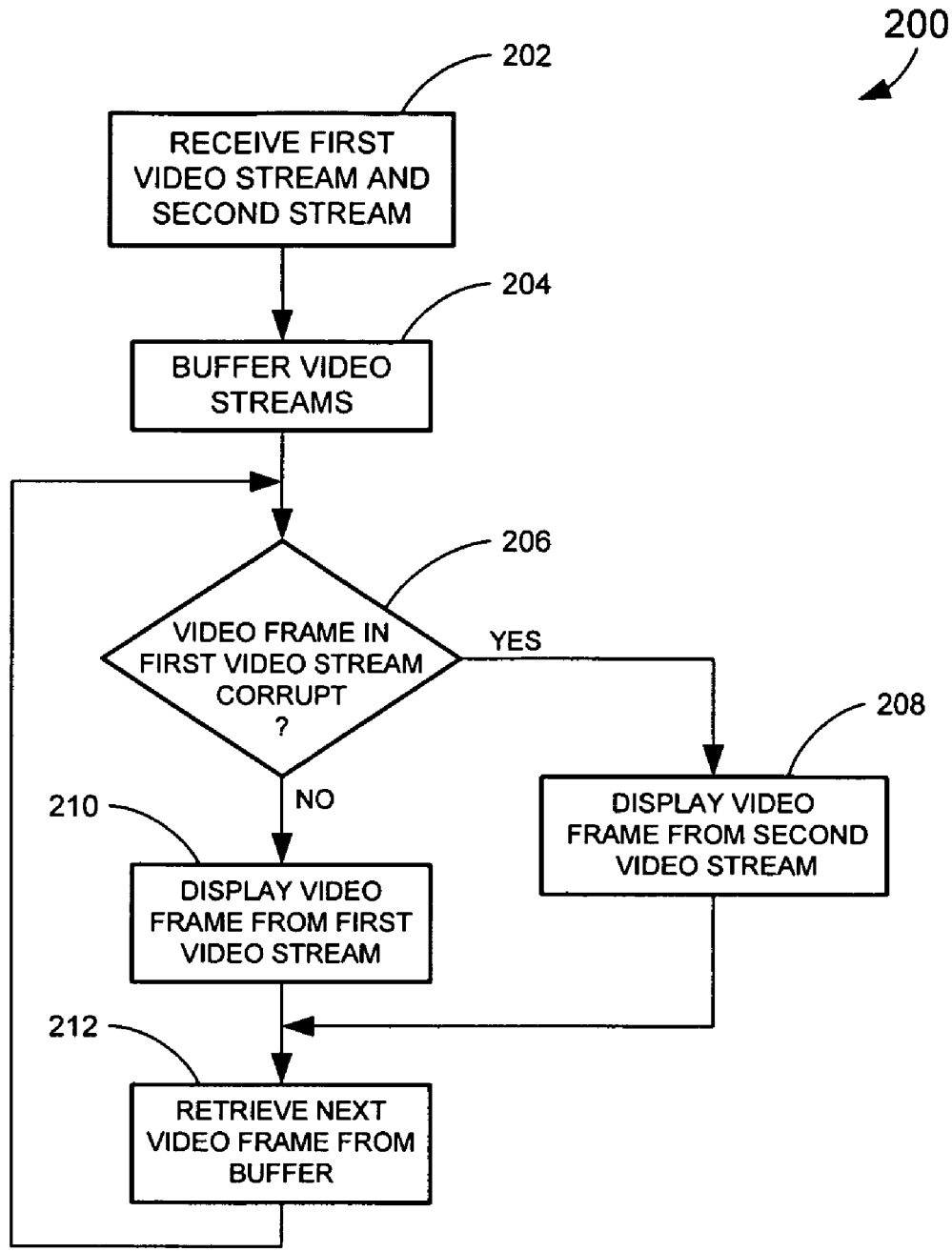
FIG. 2 is a flow chart of an exemplary routine that addresses frame loss in a video stream.

With reference to FIG. 2, an exemplary routine 200 is depicted, which provides a technique for addressing frame loss in a video stream. In step 202, a first video stream and a second video stream are received. While only two video streams are discussed with reference to FIG. 2, it should be appreciated that more than two video streams may be received by a receiver system constructed according to various embodiments of the present invention. Next, in step 204, one or more of the video streams is buffered. Then, in decision step 206, it is determined whether the video frame in a first video stream, e.g., a primary video stream, is corrupt. If so, control transfers to step 208, where a correlated video frame from a second video stream, e.g., a secondary video stream, is selected and displayed. As noted above, frames of a primary and secondary video stream may be correlated through a number of different techniques. If the current video frame in the first video stream is not, corrupt in step 206, control transfers to step 210, where the video frame of the first video stream is selected and displayed. Next, in step 212, a next video frame is received from a first buffer associated with the first video signal, at which point control returns to step 206. It should be appreciated that the routine 200 operates continuously, while the system 100 is active.

Accordingly, a technique has been described herein that replaces lost or corrupted video frames, associated with a first video stream, with uncorrupted video frames from a second correlated video stream. This is advantageous in that the technique allows a mobile video receiver system to provide video, even when a video frame of a primary video stream is corrupt.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method to address frame loss in a video stream, comprising the steps of:
   transmitting both a first video stream and a second video stream, wherein the first video stream and the second video stream are both transmitted in their entirety so that both have the same content;
   receiving the first video stream in a one-way communication only receiver;
   receiving the second video stream in a one-way communication only receiver, wherein the first and second video streams each include related video information having a plurality of video frames;
   after receiving the first video stream and the receiving second video stream, buffering at least one of the first and second video streams; and
   replacing lost or corrupted video frames associated with the first video stream with uncorrupted video frames from the second video stream.

2. The method of claim 1, wherein the first and second video streams have the same format, and wherein the first video stream is a time delayed version of the second video stream.

3. The method of claim 2, wherein a time delay between the first and second video streams is a predetermined value known to a receiver of the first and second video streams.

4. The method of claim 1, wherein the first and second video streams each include watermarks that are correlated to facilitate video frame alignment.

5. The method of claim 1, wherein the first and second video streams are cross-correlated in time to facilitate video frame alignment.

6. The method of claim 1, wherein the first and second video streams each include time codes that are utilized to correlate the first and second video streams to facilitate video frame alignment.

7. The method of claim 1, wherein the first and second video streams are formatted as satellite digital audio radio (SDAR) video, digital video broadcast-satellite (DVB-S) video, digital video broadcast-handheld (DVB-H) video, digital video broadcast-terrestrial (DVB-T) video, integrated services digital broadcast-terrestrial (ISDB-T) video, VCAST video, MEDIAFLO video or national television system committee (NTSC) video, and wherein a format of the second video stream is different from the first video stream.

8. The method of claim 1, wherein the step of transmitting both a first video stream and a second video stream transmits both video streams without feedback that either video stream is received.

9. A method to address frame loss in a video stream, comprising the steps of:
    transmitting both a first video stream and a second video stream, wherein the first video stream and the second video stream are both transmitted in their entirety so that both have the same content;
    receiving the first video stream in a one-way communication only receiver from a first transmitter;
    receiving the second video stream in a one-way communication only receiver from a second transmitter, wherein the first and second video streams each include related video information having a plurality of video frames, and wherein the first and second video frames are in different formats;
    after receiving the first video stream and the receiving second video stream, buffering at least one of the first and second video streams; and
    replacing corrupted video frames associated with the first video stream with uncorrupted video frames from the second video stream.

10. The method of claim 9, wherein the first video stream is a time delayed version of the second video stream.

11. The method of claim 10, wherein a time delay between the first and second video streams is a predetermined value known to a receiver of the first and second video streams.

12. The method of claim 9, wherein the first and second video streams each include watermarks that are correlated to facilitate video frame alignment.

13. The method of claim 9, wherein the first and second video streams are cross-correlated in time to facilitate video frame alignment.

14. The method of claim 9, wherein the first and second video streams each include time codes that are utilized to correlate the first and second video streams to facilitate video frame alignment.

15. The method of claim 9, wherein the first and second video streams are formatted as satellite digital audio radio (SDAR) video, digital video broadcast-satellite (DVB-S) video, digital video broadcast-handheld (DVB-H) video, digital video broadcast-terrestrial (DVB-T) video, integrated services digital broadcast-terrestrial (ISDB-T) video, VCAST video, MEDIAFLO video or national television system committee (NTSC) video, and wherein a format of the second video stream is different from the first video stream.

16. A video system that addresses frame loss in a video stream, comprising:
    a transmitter transmitting both a first video stream and a second video stream, wherein the first video stream and the second video stream have the same content;
    a first receiver for receiving a first video stream;
    a second receiver for receiving a second video stream, wherein the first and second video streams each include related video information having a plurality of video frames, wherein neither the first receiver nor the second receiver is able to send a signal back to the transmitter;
    a buffer coupled to the first receiver and the second receiver for buffering at least one of the first and second video streams;
    a video aligner for replacing corrupted video frames associated with the first video stream with uncorrupted video frames from the second video stream; and
    a display for displaying the video frames.

17. The system of claim 1, wherein the first and second video streams have the same format, and wherein the first video stream is a time delayed version of the second video stream.

18. The system of claim 17, wherein a time delay between the first and second video streams is a predetermined value known to the video aligner.

19. The system of claim 16, wherein the first and second video streams each include watermarks that are correlated to facilitate video frame alignment by the video aligner.

20. The system of claim 16, wherein the first and second video streams are cross-correlated in time to facilitate video frame alignment by the video aligner.

21. The system of claim 16, wherein the first and second video streams each include time codes that are utilized to correlate the first and second video streams to facilitate video frame alignment by the video aligner.

22. The system of claim 16, wherein the first and second video streams are formatted as satellite digital audio radio (SDAR) video, digital video broadcast-satellite (DVB-S) video, digital video broadcast-handheld (DVB-H) video, digital video broadcast-terrestrial (DVB-T) video, integrated services digital broadcast-terrestrial (ISDB-T) video, VCAST video, MEDIAFLO video or national television system committee (NTSC) video, and wherein a format of the second video stream is different from the first video stream.

* * * * *